F. SCHUTZE.
TEAT FOR BABY SOOTHERS AND PACIFIERS.
APPLICATION FILED FEB. 16, 1909.
997,331.
Patented July 11, 1911.
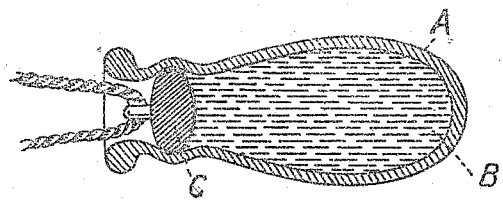

UNITED STATES PATENT OFFICE.

FREDERICK SCHUTZE, OF LONDON, ENGLAND.

TEAT FOR BABY SOOTHERS AND PACIFIERS.

997,331.  Specification of Letters Patent.  Patented July 11, 1911.

Application filed February 16, 1909. Serial No. 478,185.

*To all whom it may concern:*

Be it known that I, FREDERICK SCHUTZE, of the Black Bull Works, Calendonian Market, London, N., England, a subject of the King of Great Britain and Ireland, have invented certain new and useful Improvements in the Manufacture of Teats for Baby Soothers and Pacifiers and the Like, of which the following is a specification, reference being had therein to the accompanying drawings, which form a part thereof.

This invention relates to infant soothers or pacifiers technically called dummy teats, and the object is to make them soft, elastic and hygienic, so that they retain their shape and pliability in use, and also remain clean and wholesome. Such teats have been made hitherto of hollow rubber or filled with cotton waste, flock, tow or other cheap and non-hygienic packing. The hollow teats collapse in use, and are then inelastic and lose the shape of the natural nipple, while the teats filled as hereinbefore mentioned become knotty and hard in use, cause pain and further frequently convey disease germs to the infant, whose teeth bite through the rubber.

In the accompanying drawings, I have shown a cross section of a dummy teat embodying my invention.

In this my invention, the dummy teat is made of an outer casing A composed of pure non-mineralized rubber in the shape of the natural nipple, which I fill with a mixture of chemically pure glycerin and gelatin, in the proportion of about fourteen parts of glycerin to one part of gelatin or with any other pure and suitable gelatinous material, harmless to the infant and in its action upon the rubber teat the open end of which is hermetically plugged to prevent the escape of the filling (which I have indicated at B in the drawings) therefrom, and the teat is then secured to a shield and holder in any suitable way. The sealing of the casing A is accomplished by means of a plug C inserted in and cemented or otherwise secured to the neck of said casing. A teat thus filled will always remain soft, elastic and hygienic and retains its original correct shape.

Having now described my invention, I claim as new and desire to secure by Letters Patent the following:—

1. As a new article of manufacture, a dummy teat comprising a hollow casing of elastic material, a fluid filling of chemically pure ingredients, and a closure plug hermetically sealing said casing.

2. As a new article of manufacture, a dummy teat comprising a hollow casing of non-mineralized rubber, a filling therefor of a chemically pure mixture of glycerin and gelatinous material, and a closure hermetically sealing said casing.

In witness whereof I have hereunto set my hand in presence of two witnesses.

F. SCHUTZE.

Witnesses:
E. WYLD,
H. D. MARMER.